(12) United States Patent
Davidson et al.

(10) Patent No.: US 7,074,516 B2
(45) Date of Patent: Jul. 11, 2006

(54) VENT FOR CYLINDRICAL ELECTROCHEMICAL BATTERIES

(75) Inventors: Gregory J. Davidson, Oregon, WI (US); David R. Mihara, Madison, WI (US)

(73) Assignee: Rovcal, Inc., Madison, WI (US)

( * ) Notice: Subject to any disclaimer, the term of this patent is extended or adjusted under 35 U.S.C. 154(b) by 474 days.

(21) Appl. No.: 10/364,792

(22) Filed: Feb. 11, 2003

(65) Prior Publication Data

US 2003/0152831 A1  Aug. 14, 2003

Related U.S. Application Data (60) Provisional application No. 60/355,911, filed on Feb. 11, 2002, provisional application No. 60/402,494, filed on Aug. 8, 2002.

(51) Int. Cl.
   *H01M 2/12*   (2006.01)
   *H01M 2/02*   (2006.01)

(52) U.S. Cl. ............................ 429/54; 429/56; 429/165

(58) Field of Classification Search ................ 429/164, 429/165, 174, 175, 176, 53, 54, 55, 56
See application file for complete search history.

(56) References Cited

U.S. PATENT DOCUMENTS

| | | | |
|---|---|---|---|
| 3,355,329 A | 11/1967 | Wilke et al. | 136/134 |
| 3,663,301 A | 5/1972 | Ralston et al. | 136/107 |
| 4,442,184 A * | 4/1984 | Spanur | 429/54 |
| 4,628,012 A | 12/1986 | Spahrbier | 429/53 |
| 4,999,246 A | 3/1991 | Jechel et al. | 428/192 |
| 5,814,419 A | 9/1998 | Kenyon et al. | 429/165 |

FOREIGN PATENT DOCUMENTS

| | | |
|---|---|---|
| GB | 2 143 365 A | 2/1985 |
| WO | WO 00/67335 A | 11/2000 |

\* cited by examiner

*Primary Examiner*—Patrick Joseph Ryan
*Assistant Examiner*—Thomas H. Parsons
(74) *Attorney, Agent, or Firm*—Senniger Powers (57) ABSTRACT

An electrochemical cell is presented having a gasket that is sealed against the container to prevent electrolyte leakage during normal operation. When the internal pressure of the cell reaches a predetermined threshold, the seal is removed, thereby permitting electrolyte to escape through a vent.

51 Claims, 4 Drawing Sheets

Fig. 1

Prior Art

Prior Art

Fig. 2

Prior Art

VENT FOR CYLINDRICAL ELECTROCHEMICAL BATTERIES

CROSS-REFERENCE TO RELATED APPLICATIONS

The present application claims priority to U.S. Patent application Ser. No. 60/355,911, filed Feb. 11, 2002 and entitled "Vent for Cylindrical Electrochemical Batteries", and further claims priority to U.S. Patent application Ser. No. 60/402,494, filed on Aug. 8, 2002 and entitled "Vent for Cylindrical Electrochemical Batteries", the disclosures of which are hereby incorporated by reference as if set forth in its entirety herein.

STATEMENT REGARDING FEDERALLY SPONSORED RESEARCH OR DEVELOPMENT

1. Field of the Invention

The present invention relates generally to electrochemical cells, and in particular, relates to a method and apparatus for venting pressurized cell contents of a battery.

2. Description of the Related Art

Conventional electrochemical cells, such as alkaline cells, comprise a cathode which is a mixture of manganese dioxide, $MnO_2$, and a carbonaceous material, typically graphite. In some cylindrical alkaline cells, this cathode mixture, which is often wetted with an alkaline electrolyte, is compressed into annular rings. The cathode is then placed into a metal container which then provides the positive current collector. An anode material is disposed radially inwardly of the cathode, and generally comprises a powdered zinc disposed in a gel, such as carboxymethylcellulose. A separator is disposed between the anode and cathode, and electrically separates the cathode from the anode while permitting the electrolyte to flow therebetween. The negative current collector, usually a brass pin or nail, is placed in electrical contact with the anode.

Such cells include a seal that prevents the materials disposed within the cell from escaping at the interface between the endplate and the container. During normal use of the cell, the pressure within the cavity is sufficiently low, thereby presenting substantially no threat to the integrity of the cell structure. However, if the battery is misused, substantial pressure may build up within the cell. For example, if a user attempts to charge a non-chargeable cell, or exposes the cell to extreme heat, significant pressure may accumulate within the cell. If no means exists to dissipate the pressure, the battery could fail in an unpredictable manner.

To prevent this occurrence, a vent is installed in the cell that remains closed until the pressure exceeds a threshold limit, at which time the vent will open, thereby permitting the pressure to dissipate from the cell and into the ambient environment. Unfortunately, conventional vents include large gaskets and other components that occupy a significant amount of space within the cell that could otherwise be occupied by active anode/cathode materials. Furthermore, the operation of conventional vents has been inconsistent and unpredictable, as will now be described. It should be appreciated in the following figures that the structures are not necessarily drawn to scale.

Figure 1:
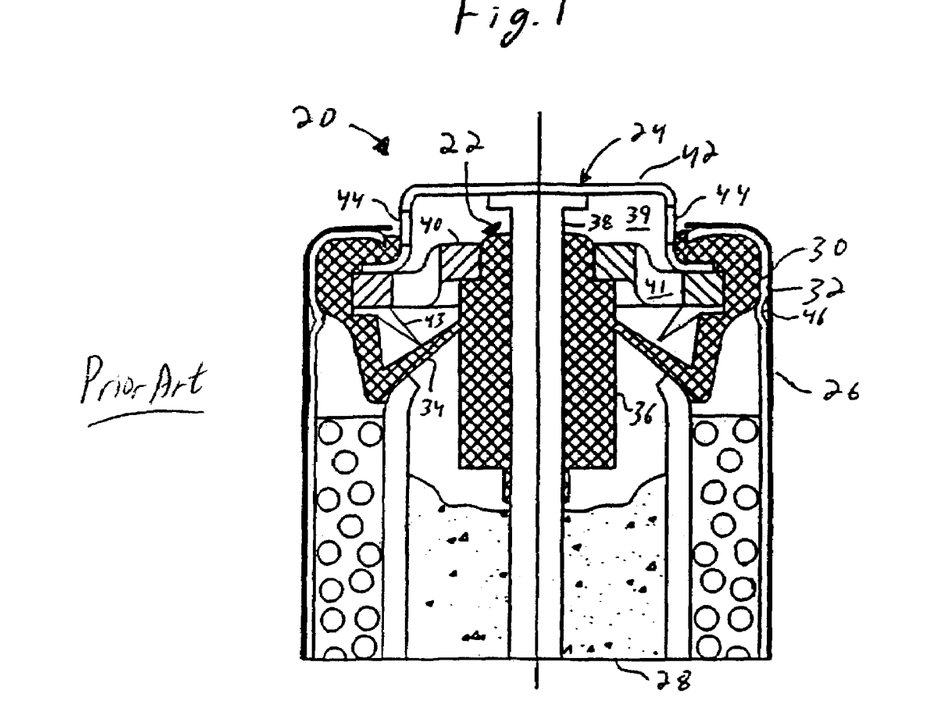
FIG. 1 is a schematic side sectional view of the negative terminal end of one conventional electrochemical cell.

For example, FIG. 1 illustrates an alkaline cell 20 having a gasket 22 that is positioned proximal to the negative end 24 the cell. Gasket 22 is used in combination with other components to provide both a seal and a vent for the active anode/electrolyte mixture 28. Gasket 22 comprises an outer annular member 30 that is surrounded by the can 32, and connects to an arm 34 at its radially inner surface. Arm 34 extends radially inwardly from member 30 to a neck 36 that surrounds the negative current collector 38. A washer 40 extends radially between the outer annular member 30 and neck 36, and holds member 30 radially against the inner surface of the can 32 to ensure the proper location of gasket 22. The can 32 defines a shallow groove 46 that extends radially inwardly and supports the lower end of outer member 30. A label 26 surrounds and insulates the can 32.

The cell 20 is assembled by installing the gasket 22 and washer 40 such that the outer member 30 is properly seated proximal the groove 46. An aperture 41 extends through washer 40 that allows for pressure dissipation. The cell is then sealed by crimping the can 32 and outer flange of the member 30 over the negative endplate 42. The crimping step forces the outer member 30 radially inwardly against the washer 40 to provide a radially compressed seal for the cell 20. While the groove 46 is operable to support the gasket 22 in its proper position and orientation when the gasket is radially sealed, the groove is not sufficiently deep to provide an axially compressed seal.

At least one aperture 44 extends radially through the endplate 42, and is sufficiently large so as to enable the passage of anode/electrolyte mixture 28 therethrough when the cell 20 is venting. Because aperture 44 extends axially downstream of can 32 and label 26, the endplate 42 must also extend beyond the axially outer end of can 32 in order to accommodate the aperture 44. Accordingly, the inner surface of endplate 42 and outer surface of washer define an internal void 39 that occupies valuable space within the cell 20. Nubs 43 extend from the washer 40 to pierce the arm 34 during expansion. When the internal pressure of the cell reaches a predetermined threshold, the arm 34 expands axially outward until nubs 43 pierce arm 34, thereby allowing the pressurized electrolyte and anode material to escape through the washer 40 and out the apertures 44. Arm 34 has a reduced thickness to aid in breakage during instances of high pressure. While this design is suitable for its intended purpose of pressure dissipation, the void 39 occupies valuable space that decreases the usable internal volume of the cell cavity that could otherwise contain anode/electrolyte material, thereby reducing the usable life of the cell. Furthermore, this design not only allows electrolyte to escape, but further allows solid particles, such as zinc, to escape where it may come into contact with human skin. The solid zinc particles may also block the passages 39, 41, and 44, thereby preventing the dissipation of internal pressure.

Figure 2:
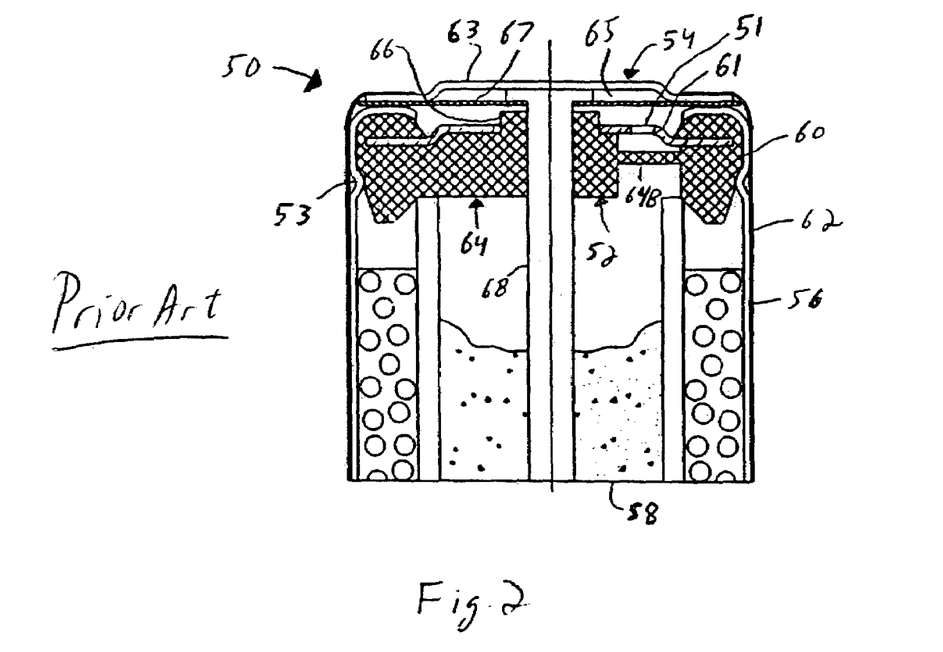
FIG. 2 is a schematic sectional side elevation view of the negative terminal end of another conventional electrochemical cell.

Referring to FIG. 2, another example of a conventional cell 50 includes an outer can 62 that is surrounded by a conventional label 56. An endplate 63 is disposed at the negative end 54 of the cell 50. A centrally disposed negative current collector 68, such as a brass pin or nail, extends axially inwardly from endplate 63. Cell 50 includes a gasket 52 having a radially outer member 60 that is disposed adjacent the radially inner surface of outer can 62. A shallow groove 53 is formed in the outer can 62 and supports the undersurface of outer member 60. Gasket further includes a neck 66 that surrounds current collector 68 and is substantially aligned with outer member 60 in the radial direction. Neck 66 and outer member 60 are connected via a radially extending arm 64. Arm 64 has a cylindrical panel of reduced thickness 64B to aid in breakage and provide a vent for pressurized internal cell contents.

A washer 61 extends between neck 66 and outer member 60, and supports a seal between outer member 60 and can 62, and between neck 66 and current collector 68. An aperture 51 extends through washer 61 and is in fluid communication with panel 64B to assist in pressure dissipation. The can 62 is crimped over the axially outer end of outer member 60 to provide a radially compressed seal for the cell 50. An insulating strip 67 extends radially across the negative end 54 and separates the crimped portion of positive can 60 from electrical contact with negative endplate 63. An internal void 65 is defined by insulating strip 67 and endplate 63.

When pressure accumulates within the cell, arm 64B ruptures, thereby allowing the pressurized electrolyte/anode mixture 58 to pass through the aperture 51 in the washer 61. The pressurized fluid then acts against the underside of insulator 67 and begins to flow between the insulator and outer crimped end of the can 56. As additional pressure builds up, the endplate 63 begins to slip with respect to the label 62 and move outwardly, thereby increasing the size of void 65 to enable additional anode/electrolyte 58 to flow therein. If the flow of pressurized cell contents into the increased void 65 enables pressure within the cell 50 to sufficiently dissipate, then the venting will cease. If, however, more fluid needs to vent, the pressure acting against the underside of the endplate 63 will continue until the label slides completely free of the endplate. Accordingly, the cell could fail in an unpredictable manner, either as a slow leak of pressurized fluid or as a violent explosion. Furthermore, if the cell 50 is disposed in a battery compartment of a device at the time of venting, the expansion of the endplate 63 would render the cell difficult to remove, and could damage the device. Moreover, as described above, this design allows both electrolyte and anode material to come into contact with human skin.

Figure 3:
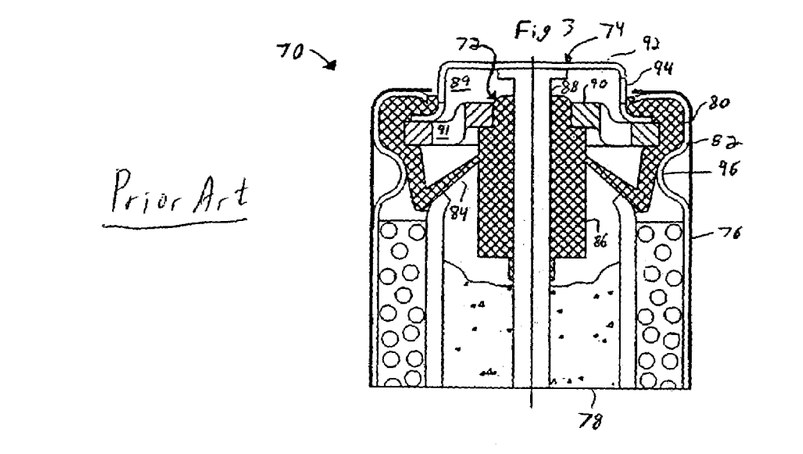
FIG. 3 is a schematic sectional side elevation view of the negative terminal end of another conventional electrochemical cell.

Referring now to FIG. 3, yet another example of a conventional alkaline cell 70 similar to that illustrated in FIG. 1 having a gasket 72 that is positioned proximal the negative end 74 the cell. The gasket 72 is used in combination with other components to provide both seal and vent for active anode/electrolyte mixture 78. Gasket 72 includes an outer annular member 80 that is surrounded by the can 82, and connects to an arm 84 at its radially inner surface. The arm 84 extends radially inwardly from member 80 to a neck 86 that surrounds the negative current collector 88. A washer 90 extends radially between the outer annular member 80 and neck 86, and biases member 80 radially outwardly against the inner surface of the can 82. Washer 90 defines an aperture 91 extending therethrough for pressure dissipation. The can 82 defines a deep groove 96 that extends radially inwardly and supports the undersurface of outer member 80 to hold gasket 72 properly in position. Groove 96 is furthermore sufficiently deep so as to support an axial seal at the interface between the can 82 and gasket 72. A label 76 surrounds the can 82.

As described above, the cell is sealed by crimping the can 82 and outer flange of the member 80 over the negative endplate 92. The anode/electrolyte mixture 78 can pass through at least one aperture 94 extending radially through the endplate 92 when the cell 70 is venting. Accordingly, the inner surface of endplate 92 and outer surface of washer 90 define an internal void 89 that occupies space within the cell 70. The crimping step forces the outer member 80 axially inwardly against the groove 96 to provide an axially compressed seal for the cell 70. The cell 70 vents in a similar manner as that illustrated in FIG. 1, in that arm 84 ruptures to provide an outlet for pressurized cell contents.

All of the seals and vents incorporated in the cells described above suffer from disadvantages. For instance, they occupy a significant volume within the cell that could otherwise be used to retain active cell components. Furthermore, they enable both electrolyte and anode particles to escape from an overpressurized cell. Additionally, when internal cell pressure exceeds a threshold, the venting mechanism operates in an unpredictable manner.

What is therefore needed is an electrochemical cell having an improved seal/vent that operates in a nonviolent and predictable manner and that increases the internal volume of the cell cavity that can be occupied by active material during normal use.

BRIEF SUMMARY OF THE INVENTION

The present invention provides an electrochemical cell having a negative terminal end. The cell includes a cylindrical container having an upstanding sidewall presenting an inner and outer surface and a terminal end proximal the negative terminal end of the cell. An annular cathode ring is disposed within the container having an inner peripheral sidewall. An ionically permeable separator is disposed adjacent the inner peripheral sidewall of the cathode ring and defines a central cylindrically shaped void. An anode is disposed in the central cylindrically shaped void. A negative current collector is electrically connected to the anode and closed at its axially outer end by a negative endplate. A gasket extends radially from the negative current collector to the container sidewall. The container is crimped about the gasket to provide a seal therebetween that is removed when internal cell pressure exceeds a predetermined threshold to enable electrolyte to flow out of the cell.

The present invention provides an electrochemical cell having a negative terminal end. The cell includes a cylindrical container having an upstanding sidewall presenting an inner and outer surface and a terminal end proximal the negative terminal end of the cell. An annular cathode ring is disposed within the container having an inner peripheral sidewall that defines a central cylindrically shaped void. An anode is disposed in the central cylindrically shaped void. An ionically permeable separator is interposed between the anode and the inner peripheral sidewall of the cathode ring. A negative current collector is electrically connected to the anode and is closed at its outer end by a negative endplate. A vent extends between the negative terminal end of the cell and the ambient environment. A gasket is disposed proximal the negative terminal end. The container is crimped about the gasket to provide a seal therebetween. The seal is removable in response to a predetermined level of internal pressure to enable electrolyte to flow out the vent.

These and other aspects of the invention are not intended to define the scope of the invention for which purpose claims are provided. In the following description, reference is made to the accompanying drawings, which form a part hereof, and in which there is shown by way of illustration, and not limitation, preferred embodiments of the invention. Such embodiments do not define the scope of the invention and reference must be made therefore to the claims for this purpose.

BRIEF DESCRIPTION OF THE DRAWINGS

Reference is hereby made to the following figures in which like reference numerals correspond to like elements throughout, and in which.

DETAILED DESCRIPTION OF THE PREFERRED EMBODIMENT

Figure 4A:
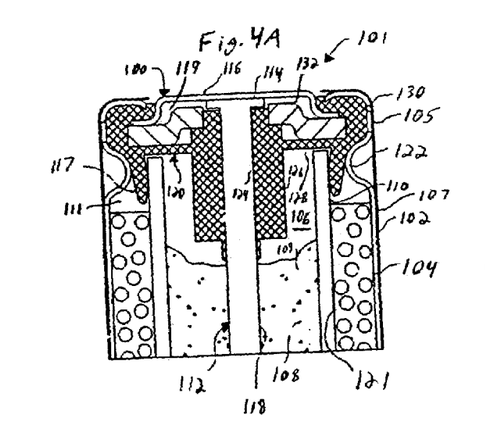
FIG. 4A is a schematic sectional side elevation view of the negative terminal end of an electrochemical cell during normal operation in accordance with the preferred embodiment of the present invention.

Referring now to FIG. 4A the negative terminal end 100 of an electrochemical cell 101 is illustrated during normal operating conditions. The cell 101 constructed in accordance with a preferred embodiment of the invention includes an outer cylindrical steel can 102 that serves as the positive current collector. A label 107 is adhesively attached to the outer surface of can 102 that insulates the container and may carry graphics on its outer surface. A plurality, typically two to four, cylindrical annular cathode rings 104 (only one shown) are formed such that their outer diameters at their outer peripheral side walls are slightly greater than the inner diameter of the can 102. Accordingly, when rings 104 are inserted into the can 102, a pressure contact is formed therebetween. Cathode rings 104 further define radially inner peripheral sidewalls 121 that define a centrally disposed cylindrical void 106, which is filled with a mixture of anode particles 108 (e.g., zinc) and electrolyte 109. A separator 110 circumscribes the void 106 and abuts sidewalls 121. A cathode chamber 111 is thus defined by the radially outer surface of separator 110 and the radially inner surface of can 102.

Alternatively, the cathode rings 104 could have a diameter smaller than the inner diameter of can 102, such that the rings would be loosely placed inside the container and then forced to conform to the inner diameter of the container through a combination of a downward force being applied at the top surface of the uppermost ring, and a rod having a fixed outer diameter being disposed into the central aperture of the ring while the downward force is being applied. It has been discovered, however, that this process of inserting and forming cathode rings 104 causes the can 102 to stretch and expand somewhat.

Separator 110 comprises several windings of a nonwoven, inert fabric that has sufficient porosity to enable permeability to gas and liquid such as an electrolyte, but substantially solid so as to prevent cathode 104 from electrically shorting with anode 108. Accordingly, separator 110 prevents the anode 108 and cathode 104 from coming into physical contact, while ensuring that any pressure buildup within the cell is distributed substantially equally within the cell. Alternatively, the separator 110 may comprise a conformal material that follows the contour of the inner surface 121, as is understood by one having ordinary skill in the art. Alternatively still, separator 110 may comprise only a single or double wrap of fabric coated with a conformal material to provide additional structure while maintaining conformance to the contour of inner surface 121. These alternate embodiments have been shown to increase the internal volume available for active cell materials.

Anode 108 is generally cylindrically shaped, has an outer peripheral surface which engages the inner surface of separator 110, and comprises gelled zinc in accordance with the preferred embodiment. The cathode 104 is a mixture of manganese dioxide, $MnO_2$, and a carbonaceous material, such as graphite, and is typically wetted with an alkaline electrolyte before being compressed into annular rings.

Cell 101 includes a negative current collector 112 in the form of a brass pin having a head 114 that is in electrical contact with a sealing disk (negative endplate 116), and a cylindrical body 118 extending axially inwardly from the head 114 that is in electrical contact with the anode 108. The endplate 116 provides a cover for the negative terminal end 100 of the cell and presents the negative connection to the cell for interface with whatever device the cell is to be used in.

Alkaline cells of this type are described, for example, in U.S. Pat. No. 5,814,419 assigned to Rayovac Corporation, the disclosure of which is hereby incorporated by reference as if set forth in its entirety herein for the purposes of background information. It should be appreciated throughout this disclosure that the terms "axially inwardly" and "upstream" refer to a direction towards the positive end of the cell 101, while the terms "axially outwardly" and "downstream" refer to a direction towards the negative end of the cell.

The axially extending portion of can 102 proximal its axial outer end defines a deep radially inwardly-formed groove 122. An aperture 105 extends through the axially extending portion of can 102 at a position adjacent and axially downstream from the groove 122. Aperture 105 is covered by the label 107, and provides a vent for the cell 101 once internal cell pressure exceeds a predetermined threshold, as will be described in more detail below.

Cell 101 further includes an annular plastic (or rubber) gasket 120 having a hub 126 presenting an inner annular surface 124. The radially inner diameter of surface 124 is sized such that hub 126 seals against the outer surface of current collector 112. Gasket 120 further includes an outer annular member 130 that is seated in groove 122 such that the radially outer surface of member 130 seals against the inner surface of can 102. Member 130 is radially aligned with vent 105 such that vent 105 is closed during normal operation. A gasket arm 128 extends radially outwardly from hub 126 and terminates at annular member 130. While a gasket arm 128 is described in this disclosure for the purposes of clarity and convenience, it should be appreciated that arm 128 is essentially a disk that joins hub 124 to member 130.

Gasket 120 further includes an annular flange 117 that extends axially upstream from the radially outer end of arm 128 at a location slightly radially inwardly of outer member 130. The radially inner surface of flange 117 abuts the radially outer surface of separator at a position axially upstream of cathode ring 104. Groove 122 biases flange 117 against separator 110 to provide a seal therebetween that prevents anode 108 from flowing into the cathode ring 104 during normal operation of the cell 101.

Gasket 120 provides a seat for a metallic washer 132, whose body is solid and does not permit the flow of fluid therethrough. The radially inner end of washer 132 is stepped axially outwardly to engage the hub 126 of gasket 120. Once the current collector 112 is installed in the gasket 120 by driving the current collector 112 through hub 126, the washer 132 is installed in the gasket such that the radially inner end of the washer 132 fits around the hub 126. Hub 126 presents a smaller inner diameter with respect to the outer diameter of the current collector to form a pressure fit therebetween. The seal formed between the hub 126 and current collector 112 prevents the electrolyte and other fluids from escaping out the central portion of the cell 121 during normal operation of the cell. Washer 132 further includes an outer annular end that is embedded in the outer annular member 130 of gasket 120, and properly positions gasket with respect to the groove 122. Washer 132 furthermore biases annular member 130 outwardly to form the above-mentioned seal with respect to the can 102 and vent 105.

Prior to installation of the current collector 112, endplate 116 is connected (typically welded) to the current collector in a manner well known in the art. The radially outer end of endplate 116 is embedded in the radially inner surface of the outer radial member 130. The radially outer surface of can 102 and label 107 are then crimped over the axially outer end of outer member 130 so to retain the endplate 116 in its proper position and to provide an axially compressed seal for the cell 101. In particular, as the axially outer end of can 102 is crimped downwardly, the axially inner end of outer annular member 130 is biased against groove 122, thereby axially compressing the annular outer member 130 and forming a seal therebetween. It should be appreciated that, during normal operation, the axial compression of gasket 120 prevents electrolyte 109 from flowing past the groove 122 and out the cell 101 via vent 105.

It has been determined that, if gasket 120 were radially compressed, the interfacial contact between groove 122 and outer radial member 130 would be insufficient to stop electrolyte flow. Furthermore, the surface area at the interface between the radially outer surface of member 130 and can 102 (which would provide the seal) would be further reduced due to the vent 105. Accordingly, while a radially compressed seal may allow electrolyte to leak during operation of the cell, it is nonetheless included as a viable alternative arrangement to the preferred embodiment in that the radially outer surface of member 130 could be increased to extend further from the vent in both directions. This would increase the surface area of the seal, but would consume space within the cell 101.

A void 119 is disposed at the negative end of the cell, and is defined as that volume disposed between the axially outer surface of gasket 120 and the axially inner surface of endplate 116. Washer 132 is thus disposed in the void 119. Advantageously, because vent 105 is formed in the can, and in particular in the axially extending portion of can 102, the size of the void 119 is reduced compared to conventional vented cells, thus increasing the size of void 106 and correspondingly increasing the amount of available anode 108 and electrolyte 109 and resulting in a longer usable life for the cell 101.

It has been determined that the present invention enables at least a 2.7% volume increase for the void 106 compared to conventional vented cells. As an example, the present invention installed in a size "AA" cell achieves a void 106 volume increase of at least 0.17 cubic centimeters when compared to a "AA" cell having a vent constructed in accordance with the prior art.

Figure 4B:
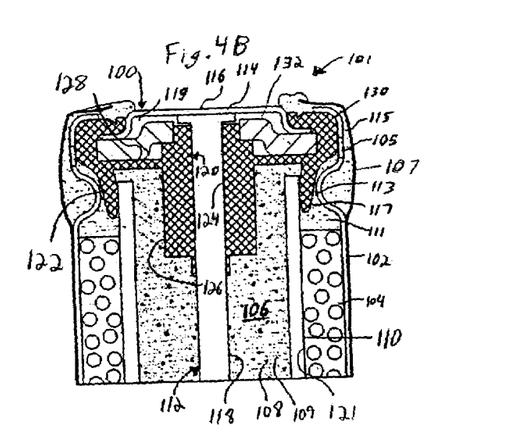
FIG. 4B is a schematic sectional side elevation view of the cell illustrated in FIG. 4, but in a vented configuration.

Referring now to FIG. 4B, cell 101 is illustrated during a high-pressure situation which, for example, could occur if a user attempts to charge the non-chargeable cell, or if the cell is exposed to extreme heat. It should be appreciated that the pressure threshold of cell 101 is defined by the strength of the seal formed between gasket 120 and can 102. When the seal is removed in response to high pressure, vent 105 provides an outlet to the ambient environment for electrolyte.

In particular, when the internal pressure exceeds a predetermined threshold, electrolyte 109 is forced from void 106 through separator 110 and into cathode chamber ill. As pressure continues to accumulate, the electrolyte acts against the radially outer surface of flange 117, thus biasing it radially inwardly away from groove 122. The pressure also acts against the axially inner surface of gasket 120, thereby biasing the outer radial member 130 axially outwardly against the crimped portion of can 102. The axial pressure of member 130 forces the crimped portion of can 102 to slide radially outwardly along the axially outer surface of member 130.

The movement of gasket 120 creates a channel 113 between the radially outer surface of outer member 130 and the radially inner surface of can 102 at the location of groove 122. Furthermore, once a sufficient amount of pressure has accumulated, radially outer member 130 becomes removed from complete radial alignment with vent 105, thereby allowing pressurized electrolyte 109 to flow from cathode chamber 111 and out the vent 105 via channel 113. As additional pressure acts against the inner surface of label 107, the adhesive wears down, forcing the label to separate from the outer surface of the can on both sides of the vent 105 until the label separates entirely from the negative end 100 of the cell 101. The separation of the label 107 from the can 102 thus provides an outlet 115 for channel 113 and vent 105, thereby permitting pressurized cell content to flow into the ambient environment at a controlled rate. Internal cell pressure is thus dissipated as electrolyte flows through channel 113 and outlet 115 into the ambient environment.

In accordance with the preferred embodiment, cell 101 is configured to begin venting pressurized electrolyte when the internal pressure reaches a predetermined threshold. While the pressure threshold depends largely on the cell size, the threshold is determined to maintain a safety margin between the vent pressure and the point at which the can 102 decrimps. The present invention currently contemplates cells reaching an internal pressure of between 100–2300 PSI before venting depending on the cell size, it being appreciated that lower internal pressure thresholds are used for larger cell sizes.

Advantageously, because the flange 117 and separator 110 prevents the flow of anode material into the cathode chamber 111, only electrolyte is permitted to flow into the ambient environment, thereby reducing the potentially toxic chemicals that could be brought into contact with human skin. Furthermore, because the cell 101 fails in a predictable manner, the cell 101 should not violently explode when venting. Additionally, because the endplate 116 does not expand relative to the negative end 100 when venting, the cell 101 will be easily removable from an electronic device. Finally, because the vent 105 is formed in the can 102 rather than the endplate 116, the size of void 119 is reduced when compared with conventional cells, thereby increasing the active anode/electrolyte volume and adding to the overall life of the cell 101. Furthermore, it should be appreciated that gasket 120 maintains its structural integrity (i.e., no breakage of the gasket 120 occurs) throughout the venting process.

Figure 5A:
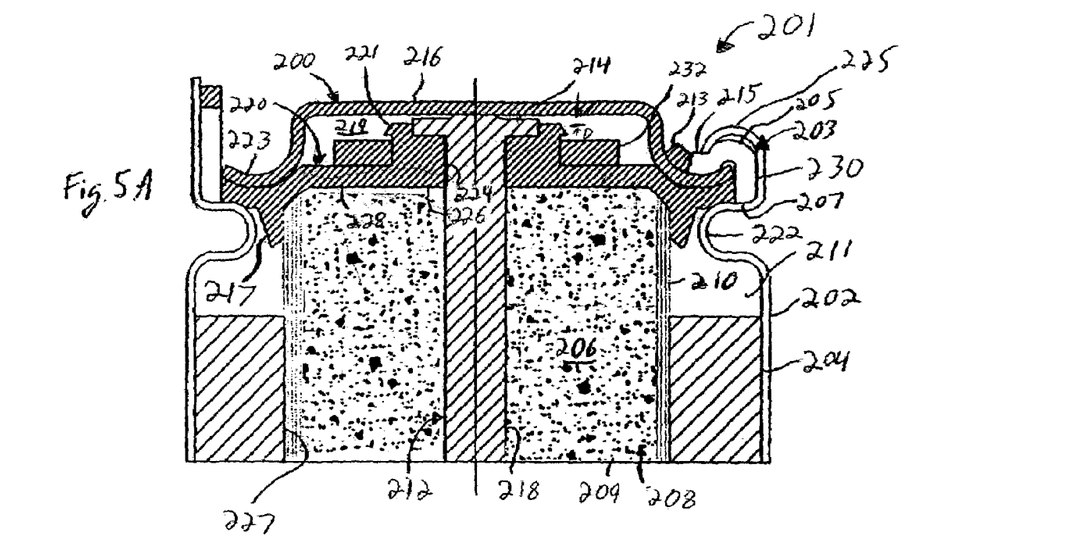
FIG. 5A is a schematic sectional side elevation view of the negative terminal end of an electrochemical cell during normal operation in accordance with an alternate embodiment of the present invention.

Referring now to FIG. 5A, the negative terminal end 200 of an electrochemical cell 201 is illustrated during normal operating conditions. The cell 201 includes an outer cylindrical steel can 202 that serves as the positive current collector. A label (not shown) may be adhesively attached to the outer surface of can 202 to insulate the container and carry graphics on its outer surface. A plurality, typically two to four, cylindrical annular cathode rings 204 (only one shown) are formed such that their outer diameters at their outer peripheral side walls are greater than the inner diameter of the can 202. Accordingly, when rings 204 are inserted into the can 202, a pressure contact is formed therebetween. Cathode rings 204 further define radially inner peripheral sidewalls 227 that define a centrally disposed cylindrical void 206. A separator 210 circumscribes the void 206, which is filled with a mixture of anode particles 208 (e.g., zinc) and electrolyte 209. A separator 210 circumscribes the void 206 and abuts sidewalls 227. A cathode chamber 211 is thus defined by the radially outer surface of separator 210 and the radially inner surface of can 202. Chamber 211 is defined herein as the entire void between the separator 210 and can 202, whether or not the void is filled with cathode 204.

Alternatively, the cathode rings 204 could have a diameter smaller than the inner diameter of can 202, such that the rings would be loosely placed inside the container and then forced to conform to the inner diameter of the container through a combination of a downward force being applied at the top surface of the uppermost ring, and a rod having a fixed outer diameter being disposed into the central aperture of the ring while the downward force is being applied. It has been discovered, however, that this process of inserting and forming cathode rings 204 causes the can 202 to stretch and expand somewhat.

Separator 210 comprises several windings of a non-woven, inert fabric that has sufficient porosity to enable permeability to gas and liquid such as an electrolyte, but substantially solid so as to prevent cathode 204 from electrically shorting with anode 208. Accordingly, separator 210 prevents the anode 208 and cathode 204 from coming into physical contact, while ensuring that any pressure buildup within the cell is distributed substantially equally within the cell. Alternatively, the separator 210 may comprise a conformal material that follows the contour of the inner surface 227, as is understood by one having ordinary skill in the art. Alternatively still, separator may comprise only a single or double wrap of fabric coated with a conformal material to provide additional structure while maintaining conformance to the contour of inner surface 227. These alternate embodiments have been shown to increase the internal volume available for active cell materials.

Anode 208 is generally cylindrically shaped, has an outer peripheral surface which engages the inner surface of separator 210, and comprises gelled zinc in accordance with the preferred embodiment. The cathode 204 is a mixture of manganese dioxide, $MnO_2$, and a carbonaceous material, such as graphite, and is typically wetted with an alkaline electrolyte before being compressed into annular rings.

Cell 201 includes a negative current collector 212 in the form of a brass pin having a head 214 that is in electrical contact with a sealing disk (negative endplate 216), and a cylindrical body 218 extending axially inwardly from the head 214 that is in electrical contact with the anode 108. The endplate 216 provides a cover for the negative terminal end 200 of the cell and presents the negative connection to the cell for interface with whatever device the cell is to be used in.

Cell 201 further includes an annular plastic (or rubber) gasket 220 having a hub 226 presenting an inner annular surface 224. The radially inner diameter of surface 224 is sized such that hub 226 seals against the outer surface of current collector 212. Gasket 220 further includes an outer annular member 230 that is disposed adjacent the can 202 and seals against the inner surface of the can. The axially extending portion of can 202 proximal its outer end defines a groove 222 that extends radially inwardly therefrom. Groove 222 supports the undersurface of outer member 230. A gasket arm 228 extends radially between the hub 226 and outer member 230.

Gasket 220, and in particular arm 228, provides a seat for a radially extending metallic washer 232. Washer 232 is a solid annular body that does not permit fluid to flow therethrough. Washer 232 has an inner diameter sized to compress hub 226 about current collector 212 to form a seal therebetween. The seal thus achieved prevents the electrolyte and other fluids from escaping out the central portion of the cell 201 during normal operation of the cell. A barb 221 projects radially outwardly from the downstream end of hub 226 and locks washer 232 in place.

Gasket 220 further includes an annular flange 217 that extends axially upstream from a location slightly radially inwardly from outer member 230. The radially inner surface of flange 217 abuts the radially outer surface of separator 210 at a position axially downstream of cathode ring 204. Groove 222 biases flange 217 against separator 210 to provide a seal therebetween that prevents anode 208 from flowing into the cathode ring 204 during normal operation of the cell 201.

It should be appreciated that gasket 220 has a low profile compared to gaskets of conventional cells, thereby increasing the amount of available volume within the cell that is occupied by active cell materials, which in turn increases the life and overall performance of the cell 201. In particular, hub 226 does not extend axially downwardly from outer radial member 230. Furthermore, hub 226 is at least in partial radial alignment with head 214 of current collector 212.

The endplate 216 includes an outer flange 223 that is seated on the axially outer surface of the radially outer end of gasket arm 228. Endplate 216 is disposed radially inwardly with respect to outer annular member 230. The axially downstream end 225 of can 202 is then crimped over member 230 such that both can 202 and member 230 sandwich the outer flange 223 against the radially outer end of arm 228 in cooperation with groove 222 to provide an axially compressed seal for the cell 201. In particular, as end 225 of can 202 is crimped downwardly, the axially inner end of outer annular member 230 is biased against groove 222, thereby axially compressing the annular outer member 230 and forming a seal therebetween. It should be appreciated that, during normal operation, the axial compression of gasket 220 prevents electrolyte 209 from flowing past the groove 222 and out the cell 201.

FIG. 5A illustrates cell 201 having only a portion of the negative end 200 crimped to further illustrate the process, it being appreciated that the entire negative end 200 is crimped during fabrication of the cell 201.

Cell 201 includes a vent generally indicated at 203 that facilitates pressure dissipation within the cell when the internal pressure has reached a predetermined threshold. In particular, a portion of outer member 230 includes a channel 205 that extends linearly there through. The upstream end of channel 205 terminates at an inlet 207. Inlet 207 is disposed proximal the groove 222, and is sealed by the groove 222 during normal operation. The downstream end of channel 205 terminates at an outlet 215. Outlet 215 extends axially outwardly with respect to cell 201 (radially outwardly with respect to outer member 230) and is in fluid communication with the ambient environment. It should be appreciated that multiple channels 205 may extend through gasket 220 to facilitate pressure dissipation. While one channel 205 is described herein (and two channels are illustrated), it is envisioned that between 1 and 1000 channels may be present in accordance with the present invention, though preferably between 15 and 35 channels, and most preferably 25 channels, extend through gasket 220 as described herein. The gasket 220 is solid at the distal end 213 of member 230 so as to provide support for an axially compressed seal without crimping the outlet 215, as will be described in more detail below.

Advantageously, because vent 205 is formed in the gasket, the size of the void 219 that is defined by the inner surface of endplate 216 and outer surface of washer 232 and gasket 220 is essentially controlled by the thickness of the head 214 of negative current collector 212.

As illustrated, the distance D between the axially outer surface of hub 226 and the axially inner surface of endplate 216 is no greater than the axial thickness of the head 214. In accordance with the preferred embodiment, the distance D is within the range of 0–0.5 mm for a size AAA cell, 0–0.6 mm for a size AA cell, and 0–0.7 mm for sizes C and D cells, and more preferably within the range of 0–0.2 mm for size AAA, AA, C, and D cells, it being appreciated that a head 214 thickness of 0.2 mm is the thinnest head thickness currently contemplated that could be easily welded to endplate 216.

The volume of the void 219 in a size AA cell constructed in accordance with the principles of the present invention as illustrated in FIG. 5A is broadly within the range of 0–0.09 cubic centimeters (cc), and more preferably within the range of 0–0.05 cc. Void 219 for a AA cell may further be approximately 0, 0.03, or 0.05 cc depending on whether one desires to occupy the entire void 219 with gasket 220, which has been previously unattainable using conventional venting techniques. Furthermore, the ranges described above may, instead of having a lower end of 0 cc, may have a lower end of 0.03 or 0.05 cc, as would be appreciated by one having ordinary skill in the art.

The volume of void 219 in a size AAA cell constructed in accordance with the principles of the present invention as illustrated in FIG. 5A is broadly within the range of approximately 0–0.03 cc, and more preferably within the range of 0–0.02 cc, and more preferably within the range of 0–0.01 cc. Void 219 for a AAA cell may further be approximately 0, 0.01, 0.02, or 0.03 cc depending on whether one desires to occupy the entire void 219 with gasket 220, which has been previously unattainable using conventional venting techniques.

The volume of void 219 in a size C cell constructed in accordance with the principles of the present invention as illustrated in FIG. 5A is broadly within the range of 0–0.4 cc, and preferably within the range of 0–0.3 cc, and more preferably within the range of 0–0.2 cc, and more preferably still within the range of 0–0.1. Void 219 for a size C cell may further be approximately 0.1, 0.2, 0.3, or 0.4 cc depending on whether one desires to occupy the entire void 219 with gasket 220, which has been previously unattainable using conventional venting techniques. Furthermore, the ranges described above may, instead of having a lower end of 0 cc, may have a lower end of approximately 0.1 cc, as would be appreciated by one having ordinary skill in the art.

The volume of void 219 in a size D cell constructed in accordance with the principles of the present invention as illustrated in FIG. 5A is broadly within the range of 0–1.1 cc, and preferably within the range of 0–0.7 cc, and more preferably within the range of 0–0.3 cc, and more preferably still within the range of 0–0.2 cc. Void 219 for a size D cell may further be approximately 0.1, 0.2, 0.3, 0.4, or 0.5 cc depending on whether one desires to occupy the entire void 219 with gasket 220, which has been previously unattainable using conventional venting techniques. Furthermore, the ranges described above may, instead of having a lower end of 0 cc, may have a lower end of approximately 0.1, 0.2, 0.3, 0.4, or 0.5 cc (where applicable).

All of the void volumes described above with reference to size AAA, AA, C, and D cells may be achieved, for instance, by adding thickness to gasket 220 in the downstream direction towards the negative end 200 of the cell 201, such that gasket 220 substantially occupies void 219. As a result, thickness may be correspondingly removed from the axially upstream end of the gasket 220 while maintaining the structural integrity of the gasket. Vent 205 thus enables gasket 220 to be configured so as to enable greater cell volume based on void 219 reduction than previously attainable using conventional vented cells. Accordingly, additional internal cell volume may be achieved that is occupied by active cell contents, thereby increasing the life of the cell 201 compared to conventional vented cell designs.

It should be appreciated that the lower ends of the ranges of void 219 volumes described above exist due to the accommodation of head 214. It should be appreciated, however, that such clearance may be reduced to substantially zero (thus producing a void 219 of zero volume) if gasket 220 were constructed so as to occupy the clearance produced by head 214. The upper ranges are defined by the thickness of gasket 220 that is desired in order to provide the corresponding desired volume of void 106 available for active cell contents.

During installation, gasket 220 is placed in the negative end of cell 201 such that outer member 230 sits on groove 222. Current collector 212, which has been pre-welded to endplate 216, is then installed in the gasket 220 by driving the current collector 212 through hub 226, which presents a smaller inner diameter with respect to the outer diameter of the current collector 212 to form a pressure fit therebetween. The washer is then installed in the gasket such that the inner end of the washer fits over barb 221 and locks into place between arm 228 and barb 221.

Figure 5B:
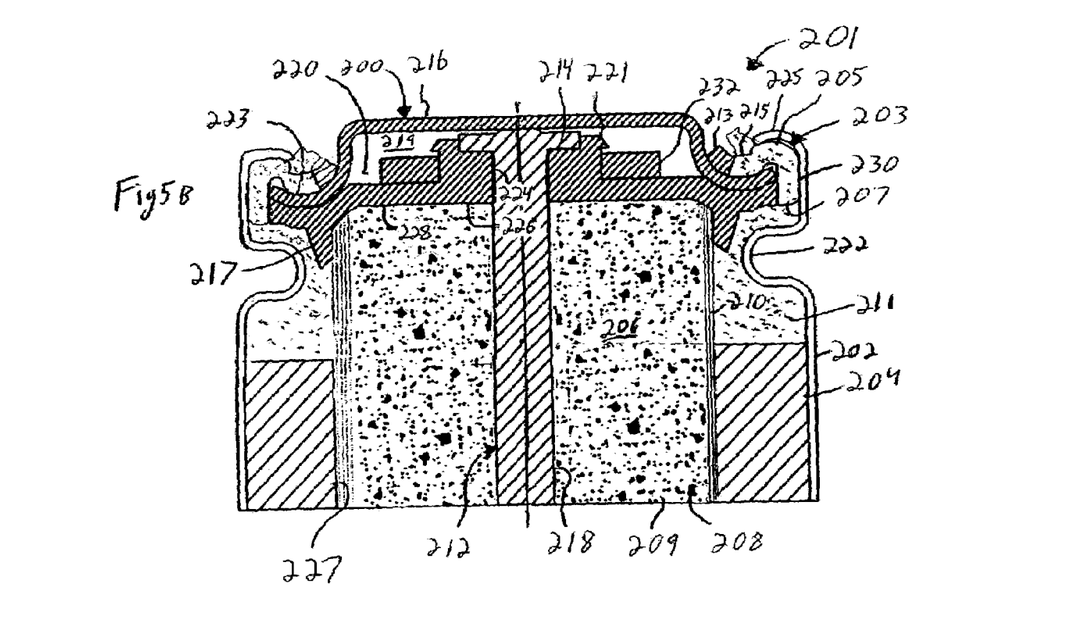
FIG. 5B is a schematic sectional side elevation view of the negative terminal end of the electrochemical cell illustrated in FIG. 5A but in a vented configuration.

Referring now to FIG. 5B, cell 201 is illustrated during a high-pressure situation which, for example, could occur if a user attempts to charge the non-chargeable cell, or exposes the cell to extreme heat. The pressure threshold of cell 201 is at least partially defined by the strength of the crimped end 225 of can 202, which in turn controls the integrity of the axial seal between gasket 220 and groove 222. Vent 205 provides an outlet to the ambient environment for electrolyte if significant pressure accumulates within the cell.

In particular, as the internal pressure increases, electrolyte 209 and gas are forced through separator 210 and into cathode chamber 211. As pressure continues to accumulate beyond a predetermined threshold, the pressure acts against the axially inner surface of gasket 220, thus biasing it axially outwardly away from groove 222. The axial pressure of gasket 220 forces the crimped end 225 of can 220 to yield and allow the outer radial member 230 and channel inlet 207 to translate axially away from the groove 222, thereby removing the seal previously formed therebetween. The crimped end 225 of can 202 is further removed from alignment with the channel outlet 215. Pressurized electrolyte 209 and other gasses may then flow from cathode chamber 211 into inlet 207, through channel 205, and exit the cell and flow into the ambient environment via outlet 215, thereby enabling the internal cell pressure to dissipate.

In accordance with the preferred embodiment, cell 201 is configured to begin venting pressurized electrolyte when the internal pressure reaches a predetermined threshold. While the pressure threshold depends largely on the cell size, the threshold is also determined to maintain a safety margin between the vent pressure and the point at which the can 202 decrimps. The present invention currently contemplates cells capable of reaching an internal pressure of between 100–2300 PSI before venting depending on the cell size, it being appreciated that lower internal pressure thresholds are used for larger cell sizes. The preferred embodiment envisions pressure threshold ranges that are substantially between 300 and 1600 PSI.

Advantageously, because the flange 217 and separator 210 prevents the flow of anode material into the cathode chamber 211, only electrolyte is permitted to flow into the ambient environment, thereby reducing the potentially toxic chemicals that could be brought into contact with human skin. Preventing the anode material from entering the cathode chamber also protects the vent channels from being blocked by solid particles in the anode material. Furthermore, because the cell 201 fails in a predictable manner, the cell 201 should not violently explode when venting. Finally, because the channel 205 is formed within the gasket 220 rather than the endplate 216, the size of void 219 is reduced when compared with conventional cells, thereby increasing the active anode/electrolyte volume and adding to the overall life of the cell 201. Furthermore, it should be appreciated that gasket 220 maintains its structural integrity (i.e., no breakage of the gasket 220 occurs) throughout the venting process.

Figure 6A:
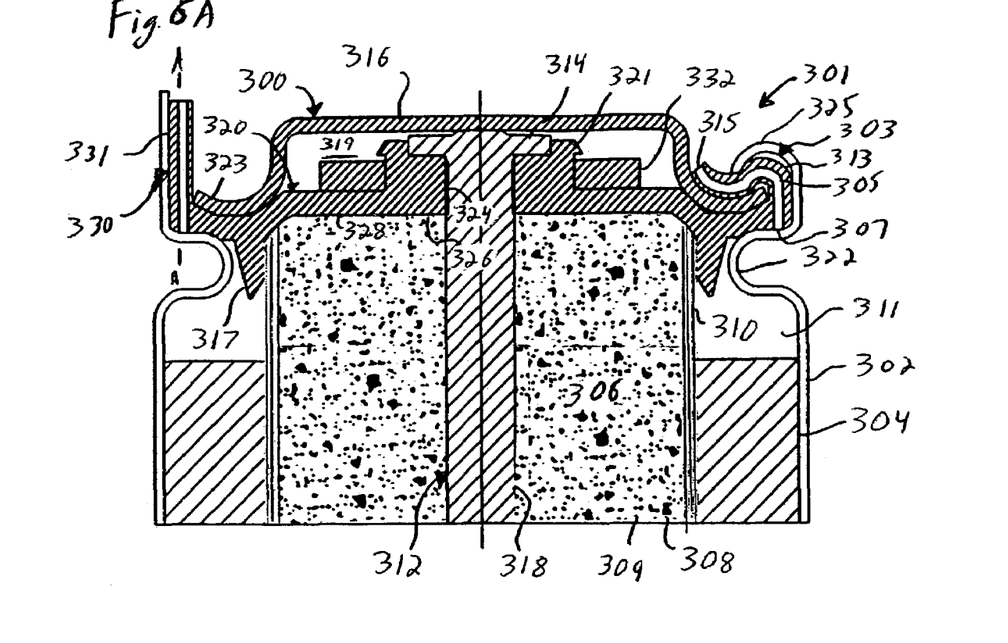
FIG. 6A is a schematic sectional side elevation view of the negative terminal end of an electrochemical cell during normal operation in accordance with an alternate embodiment of the invention.
Figure 6B:
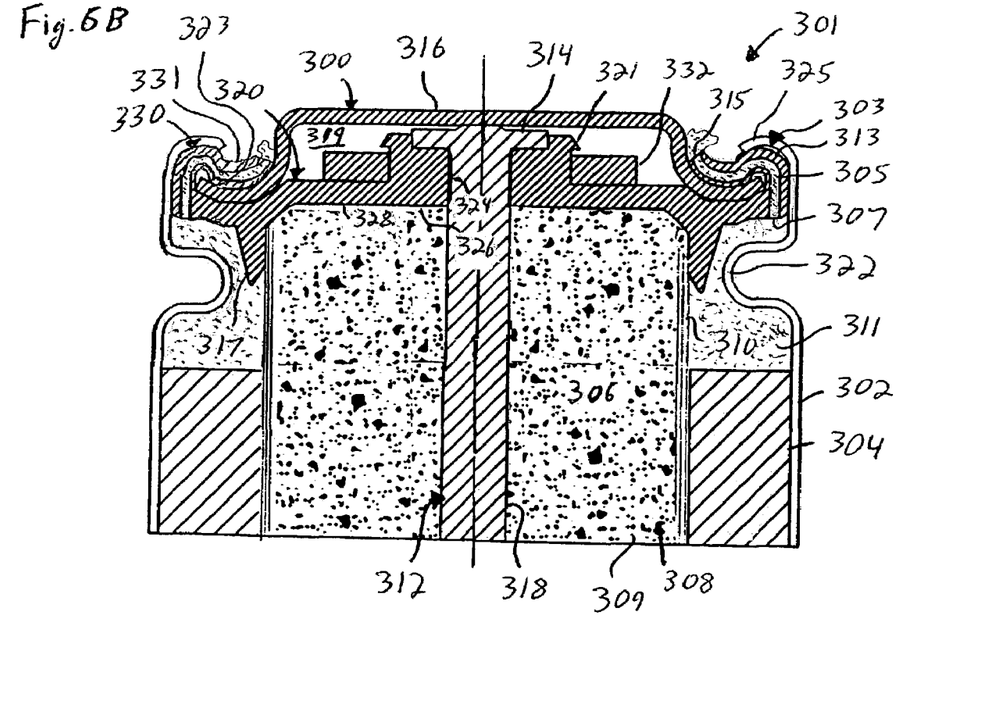
FIG. 6B is a schematic sectional side elevation view of the negative terminal end of the cell illustrated in FIG. 6A but in a vented configuration.

Referring now to FIGS. 6A and 6B, an alternate embodiment of the present invention is illustrated in which reference numerals of elements corresponding to like elements of the previous embodiment have been incremented by 100 for the purposes of clarity and convenience. The differences between cell 201 and cell 301 include the configuration of the gasket 320 and resulting seal obtained at the interface of the radially outer end 330 and can 302.

In particular, the outer portion 325 of can 302 is crimped to radially compress gasket 320 at the outer end 330 rather than axially as in the previous embodiment. A radially compressed seal is thereby formed at the interface between the radially outer member 330 of gasket 320 and can 302. The gasket 320 is thus constructed in accordance with this alternate embodiment to include sufficient radial strength to support such seal. In particular, the radially outer member 330 is annular having a longitudinally extending internal channel 305 that is offset radially inwardly from the longitudinal axis A—A of the member 330. As a result, the radially outer wall of member 330 has a sufficient thickness to withstand the radial forces imparted by the crimped portion 325 of can 302. Channel 305 thus has a reduced diameter compared to channel 205 of cell 201 in FIG. 5A and as a result requires more time to vent the pressurized cell materials. Channel 305 terminates at an outlet 315 that is aligned with the direction of channel extension. Accordingly, outlet extends longitudinally with respect to outer member 330. Alternatively, it should be appreciated that outlet could extend radially as described above with respect to channel 315.

Cell 301 operates as previously described, in that excessive internal cell pressure causes gasket 320 to translate axially downstream towards the crimped end 325 of can 302 and away from groove 322. As the can 302 decrimps, the seal provided between groove 322 and inlet 307 is removed, thereby allowing pressurized electrolyte and gasses to escape into the ambient environment via channel 305. Because outlet 315 is disposed at the downstream end of channel 305, the pressurized materials are expelled longitudinally with respect to outer member 330.

It should be appreciated that the present invention could further be implemented in accordance with several other cell chemistries known in the art, such as primary alkaline and metal-air cells, such as zinc-air, in addition to rechargeable cells such as rechargeable alkaline manganese, nickel metal hydride, and lithium ion cells, along with any other cells that could benefit by the predictable, non-violent pressure dissipation achieved by the present invention.

The invention has been described in connection with what are presently considered to be the most practical and preferred embodiments. However, the present invention has been presented by way of illustration and is not intended to be limited to the disclosed embodiments. For example, it should be appreciated that the present invention is applicable in any cylindrical cell, such as Size D, C, A, AA, and AAA cells. Accordingly, those skilled in the art will realize that the invention is intended to encompass all modifications and alternative arrangements included within the spirit and scope of the invention, as set forth by the appended claims.

We claim:

1. An electrochemical cell having a negative terminal end, comprising:
    (a) a cylindrical container having an upstanding sidewall presenting an inner and outer surface and a terminal end proximal the negative terminal end of the cell, the container defining a vent extending therethrough;
    (b) an annular cathode ring disposed within the container, the cathode ring having an inner peripheral sidewall;
    (c) an ionically permeable separator having an outer surface disposed adjacent the inner peripheral sidewall of the cathode ring and an inner surface defining a central cylindrically shaped void, the container inner surface and the separator outer surface defining a cathode chamber;
    (d) an anode disposed in the central cylindrically shaped void;
    (e) a negative current collector electrically connected to the anode and closed at its axially outer end by a negative endplate; and
    (f) a gasket that extends radially from the negative current collector to the container sidewall, wherein the container is crimped about the gasket to provide a seal therebetween that is removed when internal cell pressure exceeds a predetermined threshold to enable electrolyte to flow out of the cell, the electrolyte being in fluid communication with the vent when the internal cell pressure is greater than the predetermined threshold.

2. The cell as recited in claim 1, wherein the container defines a vent extending therethrough that is sealed by the gasket when the internal cell pressure is less than the predetermined threshold, wherein the seal is removed when the internal cell pressure is greater than the predetermined threshold.

3. The cell as recited in claim 2, further comprising a wrapping that surrounds the outer surface of the container and covers the vent, wherein the wrapping is removed from at least a portion of the container in response to contact with pressurized electrolyte.

4. The cell as recited in claim 3, wherein the gasket includes a flange that abuts the separator and prevents anode from flowing therebetween.

5. The cell as recited in claim 2, wherein the separator prevents the anode from flowing out the vent.

6. The cell as recited in claim 2, wherein the container defines a radially inwardly extending groove that supports the gasket.

7. The cell as recited in claim 6, wherein the gasket is axially compressed against the groove.

8. The cell as recited in claim 2, wherein the gasket further comprises a hub surrounding the negative current collector, a radially outer member disposed adjacent the container, and an arm connecting the hub and the radially outer member.

9. The cell as recited in claim 8, further comprising a washer extending between the hub and the radially outer member to support the seal between the container and the gasket.

10. The cell as recited in claim 9, wherein the washer further supports a seal between the gasket and the negative current collector.

11. The cell as recited in claim 1, wherein a channel extends through the gasket between a cathode chamber and ambient environment, and wherein the channel defines an intake end that is sealed by the container when the internal cell pressure is less than the predetermined threshold.

12. The cell as recited in claim 11, wherein the separator prevents anode from flowing into the channel.

13. The cell as recited in claim 11, wherein the container defines a radially inwardly extending groove that supports the gasket.

14. The cell as recited in claim 13, wherein the gasket is axially compressed against the groove.

15. The cell as recited in claim 14, wherein the channel defines an outlet extending radially with respect to the gasket.

16. The cell as recited in claim 13, wherein the gasket is radially compressed against the groove.

17. The cell as recited in claim 16, wherein the channel defines an outlet that extends axially with respect to the gasket.

18. The cell as recited in claim 11, wherein the gasket further comprises a hub surrounding the negative current collector, and a washer surrounding the hub that biases the hub radially inwardly to seal the hub against the negative current collector.

19. The cell as recited in claim 1, wherein the gasket is translated towards the negative end when the internal cell pressure exceeds the predetermined threshold.

20. The cell as recited in claim 1, wherein the cell is an alkaline cell.

21. The cell as recited in claim 1, wherein the gasket further comprises a hub surrounding the negative current collector, an outer portion disposed adjacent the container, and an arm extending between the hub and the outer portion, wherein the hub does not extend below the arm.

22. A method of venting pressure from an axially extending electrochemical cell of the type having a container defining an interior, a cathode chamber housing a cathode disposed in the interior, an anode disposed within the interior and separated from the cathode via an ionically permeable separator, a vent extending between the interior and an ambient environment, and a gasket disposed adjacent the container to seal the vent, the method comprising the steps of:
(A) generating internal cell pressure that exceeds a predetermined pressure threshold;
(B) in response to step (A), biasing the gasket axially downstream away from the container;
(C) in response to step (B), removing the seal formed between the gasket and the container; and
(D) in response to step (C), venting pressurized cell contents into the ambient environment via the vent.

23. The method as recited in claim 22, wherein step (D) further comprises venting pressurized cell contents through an aperture extending through the container.

24. The method as recited in claim 23, further comprising removing a seal formed between the vent and a label surrounding the cell.

25. The method as recited in claim 22, wherein step (D) further comprises venting pressurized cell contents through a channel extending through the gasket between the interior and the ambient environment.

26. The method as recited in claim 22, wherein the gasket remains structurally intact during steps (B) through (D).

27. The method as recited in claim 22, wherein step (B) further includes removing the gasket from a groove extending inwardly from the container.

28. The method as recited in claim 27, wherein the cell is initially crimped to close a negative end of the cell, and wherein step (B) further includes decrimping the cell.

29. A size AAA electrochemical cell disposed in an ambient environment having a negative terminal end, comprising:
(a) a cylindrical container having an upstanding sidewall presenting an inner and outer surface and a terminal end proximal the negative terminal end of the cell, wherein the container defines an interior container void;
(b) an annular cathode ring disposed within the container void and presenting an inner peripheral sidewall;
(c) an ionically permeable separator disposed adjacent the inner peripheral sidewall of the cathode ring and defines a central void;
(d) an anode disposed in the central void;
(e) a negative current collector electrically connected to the anode and closed at its axially outer end by a negative endplate; and
(f) a vent placing the container void in fluid communication with the ambient environment; and
(g) a gasket extending radially from the negative current collector to the container sidewall, wherein the negative terminal end defines a negative terminal void disposed between the gasket and the endplate, wherein the negative terminal void has a volume substantially within the range of 0–0.03 cubic centimeters.

30. The size AAA electrochemical cell as recited in claim 29, wherein the terminal void has a volume substantially within the range of 0–0.02 cubic centimeters.

31. The size AAA electrochemical cell as recited in claim 30, wherein the terminal void has a volume substantially within the range of 0–0.01 cubic centimeters.

32. A size AA electrochemical cell disposed in an ambient environment having a negative terminal end, comprising:
(a) a cylindrical container having an upstanding sidewall presenting an inner and outer surface and a terminal end proximal the negative terminal end of the cell, wherein the container defines an interior container void;

(b) an annular cathode ring disposed within the container void and presenting an inner peripheral sidewall;

(c) an ionically permeable separator disposed adjacent the inner peripheral sidewall of the cathode ring and defines a central void;

(d) an anode disposed in the central void;

(e) a negative current collector electrically connected to the anode and closed at its axially outer end by a negative endplate; and (f) a vent placing the container void in fluid communication with the ambient environment; and (g) a gasket extending radially from the negative current collector to the container sidewall, wherein the negative terminal end defines a negative terminal void disposed between the gasket and the endplate, wherein the negative terminal void has a volume within the range of 0–0.09 cubic centimeters.

33. The size AA electrochemical cell as recited in claim 32, wherein the terminal void has a volume within the range of 0–0.05 cubic centimeters.

34. The size AA electrochemical cell as recited in claim 33, wherein the terminal void has a volume within the range of 0–0.03 cubic centimeters.

35. A size C electrochemical cell disposed in an ambient environment having a negative terminal end, comprising:

(a) a cylindrical container having an upstanding sidewall presenting an inner and outer surface and a terminal end proximal the negative terminal end of the cell, wherein the container defines an interior container void;

(b) an annular cathode ring disposed within the container void and presenting an inner peripheral sidewall;

(c) an ionically permeable separator disposed adjacent the inner peripheral sidewall of the cathode ring and defines a central void;

(d) an anode disposed in the central void;

(e) a negative current collector electrically connected to the anode and closed at its axially outer end by a negative endplate; and (f) a vent placing the container void in fluid communication with the ambient environment; and (g) a gasket extending radially from the negative current collector to the container sidewall, wherein the negative terminal end defines a negative terminal void disposed between the gasket and the endplate, wherein the negative terminal void has a volume within the range of 0–0.4 cubic centimeters.

36. The size C electrochemical cell as recited in claim 35, wherein the terminal void has a volume substantially within the range of 0–0.3 cubic centimeters.

37. The size C electrochemical cell as recited in claim 36, wherein the terminal void has a volume substantially within the range of 0–0.2 cubic centimeters.

38. The size C electrochemical cell as recited in claim 37, wherein the terminal void has a volume substantially within the range of 0–0.1 cubic centimeters.

39. A size D electrochemical cell disposed in an ambient environment having a negative terminal end, comprising:

(a) a cylindrical container having an upstanding sidewall presenting an inner and outer surface and a terminal end proximal the negative terminal end of the cell, wherein the container defines an interior container void;

(b) an annular cathode ring disposed within the container void and presenting an inner peripheral sidewall;

(c) an ionically permeable separator disposed adjacent the inner peripheral sidewall of the cathode ring and defines a central void;

(d) an anode disposed in the central void;

(e) a negative current collector electrically connected to the anode and closed at its axially outer end by a negative endplate; and (f) a vent placing the container void in fluid communication with the ambient environment; and (g) a gasket extending radially from the negative current collector to the container sidewall, wherein the negative terminal end defines a negative terminal void disposed between the gasket and the endplate, wherein the negative terminal void has a volume substantially within the range of 0–1.1 cubic centimeters.

40. The size D electrochemical cell as recited in claim 39, wherein the terminal void has a volume substantially within the range of 0–0.7 cubic centimeters.

41. The size D electrochemical cell as recited in claim 40, wherein the terminal void has a volume substantially within the range of 0–0.3 cubic centimeters.

42. The size D electrochemical cell as recited in claim 41 wherein the terminal void has a volume substantially within the range of 0–0.2 cubic centimeters.

43. An electrochemical cell having a negative terminal end, comprising:

(a) a cylindrical container having an upstanding sidewall presenting an inner and outer surface and a terminal end proximal the negative terminal end of the cell, the container defining a vent extending therethrough;

(b) an annular cathode ring disposed within the container, the cathode ring having an inner peripheral sidewall;

(c) an ionically permeable separator having an outer surface disposed adjacent the inner peripheral sidewall of the cathode ring and an inner surface defining a central cylindrically shaped void, the container inner surface and the separator outer surface defining a cathode chamber;

(d) an anode disposed in the central cylindrically shaped void;

(e) a negative current collector electrically connected to the anode and closed at its axially outer end by a negative endplate; and (f) a gasket that extends radially from the negative current collector to the container sidewall, wherein the container is crimped about the gasket to provide a seal therebetween that is removed when internal cell pressure exceeds a predetermined threshold to enable electrolyte to flow out of the cell, the gasket sealing the vent when the internal cell pressure is less than the predetermined threshold, the seal being removed when the internal cell pressure is greater than the predetermined threshold.

44. The cell as recited in claim 43, further comprising a wrapping that surrounds the outer surface of the container and covers the vent, wherein the wrapping is removed from at least a portion of the container in response to contact with pressurized electrolyte.

45. The cell as recited in claim 43, wherein the separator prevents the anode from flowing out the vent.

46. The cell as recited in claim 45, wherein the gasket includes a flange that abuts the separator and prevents anode from flowing therebetween.

47. The cell as recited in claim 43, wherein the container defines a radially inwardly extending groove that supports the gasket.

48. The cell as recited in claim 47, wherein the gasket is axially compressed against the groove.

49. The cell as recited in claim 43, wherein the gasket further comprises a hub surrounding the negative current collector, a radially outer member disposed adjacent the container, and an arm connecting the hub and the radially outer member.

50. The cell as recited in claim 49, further comprising a washer extending between the hub and the radially outer member to support the seal between the container and the gasket.

51. The cell as recited in claim 50, wherein the washer further supports a seal between the gasket and the negative current collector.

* * * * *